(12) United States Patent
Jiang et al.

(10) Patent No.: US 8,854,119 B2
(45) Date of Patent: Oct. 7, 2014

(54) REGULATED CHARGE PUMP CIRCUIT

(71) Applicant: STMicroelectronics R&D Co. Ltd. (Shanghai), Shanghai (CN)

(72) Inventors: Ming Jiang, Shanghai (CN); Jackson Ding, Shanghai (CN)

(73) Assignee: STMicroelectronics R&D (Shanghai) Co. Ltd., Shanghai (CN)

( * ) Notice: Subject to any disclaimer, the term of this patent is extended or adjusted under 35 U.S.C. 154(b) by 0 days.

(21) Appl. No.: 13/924,775

(22) Filed: Jun. 24, 2013

(65) Prior Publication Data
US 2014/0009220 A1 Jan. 9, 2014

(30) Foreign Application Priority Data

Jul. 5, 2012 (CN) .......................... 2012 1 0239771

(51) Int. Cl.
*H02M 3/07* (2006.01)
(52) U.S. Cl.
CPC ....................................... *H02M 3/07* (2013.01)
USPC .............................. 327/536; 327/540; 327/541

(58) Field of Classification Search
CPC ....................................................... H02M 3/07
USPC ......... 327/536, 538, 540, 541, 543, 530, 390, 327/589
See application file for complete search history.

(56) References Cited

U.S. PATENT DOCUMENTS

| | | | |
|---|---|---|---|
| 7,276,960 B2 * | 10/2007 | Peschke | 327/536 |
| 2002/0024380 A1 * | 2/2002 | Kono | 327/541 |
| 2009/0243706 A1 | 10/2009 | Hsueh et al. | |

* cited by examiner

*Primary Examiner* — Lincoln Donovan
*Assistant Examiner* — Jung H Kim
(74) *Attorney, Agent, or Firm* — Gardere Wynne Sewell LLP

(57) ABSTRACT

A circuit includes a charge pump, a first level shifter, a second level shifter, a voltage follower and a current mirror. The charge pump is configured to generate a voltage difference between the input node and the output node. The first level shifter is coupled to the charge pump output and configured to apply a first voltage variation to the charge pump output in response to a bias current. The second level shifter is coupled to the input node and configured to apply a second voltage variation to the charge pump input. The voltage follower is configured to equalize outputs from the first and second level shifters and provide a difference current which is multiplied by the current multiplier to generate a charging current applied to the charge pump.

19 Claims, 2 Drawing Sheets

REGULATED CHARGE PUMP CIRCUIT

PRIORITY CLAIM

This application claims priority from Chinese Application for Patent No. 201210239771.1 filed Jul. 5, 2012, the disclosure of which is incorporated by reference.

TECHNICAL FIELD

This disclosure relates generally to electronic circuits, and more particularly to a regulated charge pump circuit.

BACKGROUND

Charge pump circuits are widely used in integrated circuits to provide a direct current (DC) voltage higher than a specified supply voltage. The charge pump circuit is generally controlled by clock signals of opposite phase supplied by an oscillator. For high voltage applications, the output voltage may be regulated referring to the supply voltage, and then be used to drive external or integrated N-type power MOS transistors or other suitable electronic devices.

The voltage difference between the output voltage and the supply voltage is generally determined by one or more zener diodes with or without a resistor in series. However, the voltage difference may be inaccurate due to the manufacturing deviations in integrated circuits. Moreover, a large spread could be introduced into the output voltage of the charge pump circuit, which may adversely affect the accuracy of the voltage difference between the output voltage and the supply voltage as well.

SUMMARY

Thus, there is a need for a regulated charge pump circuit capable of providing a more accurate voltage.

In one aspect, a circuit is provided. The circuit comprises a charge pump, a first level shifter, a second level shifter, a voltage follower and a current mirror. The charge pump has an input node for receiving an input voltage, a supply node for receiving a charging current and an output node for outputting an output voltage. The charge pump is configured to generate a voltage difference between the input node and the output node. The first level shifter has a first node coupled to the output node and a second node, the first level shifter is configured to apply a first voltage variation to the output voltage in response to a bias current received from a current source. The second level shifter has a third node coupled to the input node and a fourth node, the second level shifter is configured to apply a second voltage variation to the input voltage. The voltage follower is configured to set the voltage at the second node substantially equal to the voltage at the fourth node, to receive a difference current flowing through the second level shifter and to provide the difference current. The current multiplier is configured to generate the charging current in response to the difference current provided by the voltage follower.

In some embodiments of the present disclosure, the voltage difference between the output voltage and the input voltage can be well determined by the bias current and the first level shifter. In this way, the circuit is capable to provide an accurate voltage difference between its input node and output node. Moreover, the accurate voltage sensing makes it possible to use a smaller output capacitor for the charge pump circuit, which further reduces the cost for using such a charge pump circuit.

In an embodiment, the first level shifter comprises a first resistor, and the bias current is provided to the first resistor to generate the first voltage variation.

In an embodiment, the second level shifter comprises a second resistor.

In an embodiment, the voltage follower comprises: a first transistor having a first gate, a first source and a first drain, and a second transistor having a second gate, a second source and a second drain, wherein the first source is coupled to the second node of the first level shifter, the second source is coupled to the fourth node of the second level shifter, the first gate is coupled to the second gate and the first drain, and the second drain is configured to provide the difference current to the current multiplier.

In an embodiment, the voltage follower further comprises: an over voltage protector coupled between the second gate and the second source, and configured to provide over voltage protection for the second transistor.

In an embodiment, the voltage follower comprises: a second operational amplifier having a second positive input node, a second negative input node and a second output node, the second operational amplifier being configured to virtually connect the second node and the fourth node, wherein the second positive input node is coupled to the second node of the first level shifter, the second negative input node is coupled to the fourth node of the second level shifter, and the second output node is coupled to a gate of a fourth transistor so as to provide the difference current flowing through the fourth transistor to the current multiplier.

In an embodiment, the current source comprises: a first operational amplifier having a first positive input node, a first negative input node and a first output node, a third transistor and a third resistor, wherein the first positive input node is configured to receive a reference voltage, the first negative input node is coupled to a source of the third transistor, the first output node is coupled to a gate of the third transistor, and the third resistor is coupled between the source of the third transistor and a reference potential line so as to provide the bias current flowing through the third transistor.

In an embodiment, the circuit further comprising: a current limiter in parallel connection with the current multiplier, and configured to limit the amplitude of the difference current provided to the current multiplier.

In an embodiment, the charge pump comprises: a switched capacitor network having one or more switches and one or more capacitors, and the switched capacitor network is charged by the charging current in response to a control signal received at the one or more switches.

The foregoing has outlined, rather broadly, features of the present disclosure. Additional features of the disclosure will be described, hereinafter, which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in different figures generally refer to corresponding parts unless otherwise indicated. The figures are drawn to clearly illustrate the relevant aspects of embodiments of the present disclosure and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The making and using of embodiments are discussed in detail below. It should be appreciated, however, that the present disclosure provides many applicable inventive concepts that may be embodied in a wide variety of specific contexts. The specific embodiments discussed are merely illustrative of specific ways to make and use the disclosure, and do not limit the scope of the disclosure.

Figure 1:
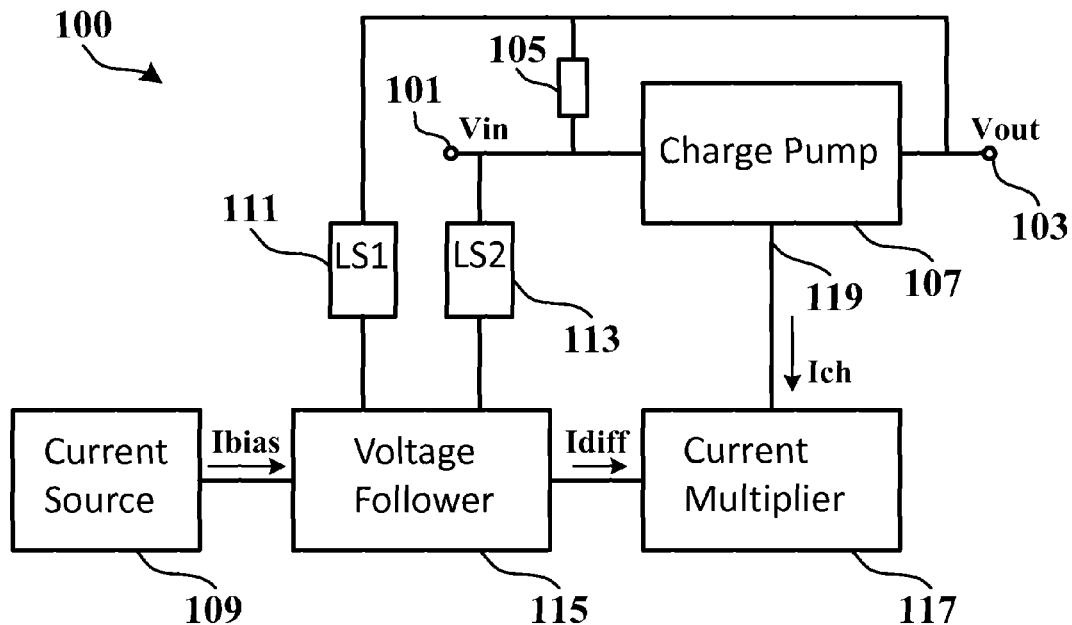
FIG. 1 shows a block diagram of a first embodiment of a circuit 100 according to the disclosure.

FIG. 1 shows a block diagram of a first embodiment of a circuit 100 according to the disclosure. The circuit 100 has an input node 101 for receiving an input voltage $V_{in}$ and an output node 103 for outputting an output voltage $V_{out}$. The circuit 100 can be used to provide a regulated voltage difference between the input node 101 and the output node 103, which is pumped higher than the input voltage $V_{in}$. The output voltage $V_{out}$ is of sufficient current driving capability to drive a load 105 coupled between the input node 101 and the output node 103. For example, the load 105 could be the equivalent load of driving discrete or integrated N-type power MOS transistors. It will be appreciated that the load 105 can also be coupled between the output node 103 and a reference potential line such as ground or a negative power supply.

As shown in FIG. 1, the circuit 100 comprises a charge pump 107, a first level shifter (LS1) 111, a second level shifter (LS2) 113, a voltage follower 115 and a current multiplier 117.

The charge pump 107 has the input node 101, the output node 103 and a supply node 119. The charge pump 107 is configured to receive the DC input voltage $V_{in}$ of a low voltage at its input node 101, and to generate the elevated output voltage $V_{out}$ at its output node 103. The charge pump 107 is configured to generate the regulated voltage difference between its input node 101 and output node 103. The charge pump 107 has one or more pump stages, and the maximum amplitude of the output voltage $V_{out}$ depends on the number of the pump stages included in the charge pump 107. For example, the charge pump 107 may be a triple charge pump whose output voltage is 3 times bigger than its input voltage. In an embodiment, the charge pump 107 comprises a switched capacitor network having one or more switches and one or more capacitors, and the switched capacitor network is charged by a charging current $I_{ch}$ in response to a control signal received at the one or more switches. The supply node 119 of the charge pump 107 is configured to receive the charging current $I_{ch}$ for charging the one or more capacitors within the charge pump 107. The amplitude of the charging current $I_{ch}$ and the duration for charging the capacitors may affect the output voltage $V_{out}$. In the embodiment, the duration for charging the capacitors is controlled by the control signal received at the switches within the charge pump 107. As the control signal is generally stable, the amplitude of the output voltage $V_{out}$ mainly depends on the charging current $I_{ch}$.

In the embodiment of FIG. 1, the circuit 100 is a regulated charge pump circuit with a regulation loop. The regulation loop is configured to sense a voltage fluctuation of the voltage difference between the output voltage $V_{out}$ and the input voltage $V_{in}$, and then to adjust the charging current $I_{ch}$ in response to the voltage fluctuation. In the embodiment, the voltage fluctuation is sensed by the first level shifter 111 in association with the second level shifter 113. Specifically, the first level shifter 111 has a first node coupled to the output node 103 and a second node, and is configured to apply a first voltage variation to the output voltage $V_{out}$ in response to a bias current $I_{bias}$ received from a current source 109. The second level shifter 113 has a third node coupled to the input node 101 and a fourth node, and is configured to apply a second voltage variation to the input voltage $V_{in}$. The first node and the third node are coupled to the output node 103 and the input node 101 respectively, and the second node is virtually connected to the fourth node via the voltage follower 115. In other words, the voltage at the second node is substantially equal to the voltage at the fourth node. In this way, the voltage difference between the output voltage $V_{out}$ and the input voltage $V_{in}$, including the voltage fluctuation, can be sensed via the first voltage variation and the second voltage variation. In some examples, the first level shifter 111 may comprise a first resistor coupled to the output node 103, and the bias current $I_{bias}$ is provided to the first resistor to generate the first voltage variation. The second level shifter 113 may comprise a second resistor coupled to the input node 101.

The voltage follower 115 is coupled between the first level shifter 111 and the second level shifter 113. The voltage follower 115 is configured to set the voltage at the second node substantially equal to the voltage at the fourth node, and to receive a difference current $I_{diff}$ flowing through the second level shifter 113. The difference current $I_{diff}$ is further provided to the current multiplier 117 by the voltage follower 115. In this way, a voltage fluctuation of the voltage difference between the output voltage $V_{out}$ and the input voltage $V_{in}$ can be transferred to the difference current $I_{diff}$ flowing through the second level shifter 113. In some examples, the voltage follower 115 may be an operational amplifier whose positive and negative input nodes are coupled to the second node of the first level shifter 111 and the fourth node of the second level shifter 113 respectively. The input characteristic of the operational amplifier ensures the second node and the fourth node to be virtually connected. In some other examples, the voltage follower 115 may be a simplified amplifier with two transistors whose gates are coupled to each other. Thus, the source voltage for one of the two transistors may change with the source voltage of the other of the two transistors. Further, the width to length ratios of the two transistors could be set equal to each other.

Moreover, the first level shifter 111 is biased by the bias current $I_{bias}$, which is provided by the current source 109. The bias current $I_{bias}$ is of a predetermined value such that the first voltage variation across the first level shifter 111 can be stabilized. In this way, the voltage fluctuation of the voltage difference between the output voltage $V_{out}$ and the input voltage $V_{in}$ is mainly applied across the second level shifter 113. In an example, the second level shifter 113 is a resistor, and therefore the voltage fluctuation may be further transferred to the difference current $I_{diff}$ that flows through the second level shifter 113.

The current multiplier 117 is coupled to the voltage follower 115 to receive the difference current $I_{diff}$. The current multiplier 117 is configured to generate the charging current $I_{ch}$ to be supplied to the charge pump 107 in response to the difference current $I_{diff}$ provided by the voltage follower 115. In some examples, the current multiplier 117 may be a current mirror which mirrors the charging current $I_{ch}$ from the difference current $I_{diff}$ at a current multiple factor. Thus, the charging current $I_{ch}$ is proportional to the difference current $I_{diff}$. In this way, the voltage fluctuation can be effectively compensated by the charging current $I_{ch}$, and therefore the regulated voltage difference can be provided to the load 105 between the input node 101 and the output node 103.

From the foregoing, the regulated voltage difference is provided between the input node 101 and the output node 103, which equals to the difference between the first voltage variation and the second voltage variation. In practical applications, the second voltage variation can be set to a much small value in comparison with the first voltage variation by using a large current ratio of the charging current $I_{ch}$ to the difference current $I_{diff}$. Thus, the regulated voltage difference the circuit 100 capable to provide is mainly determined by the first voltage variation, which is much easier to change by adjusting the bias current $I_{bias}$. Moreover, the accurate voltage sensing makes it possible to use a smaller output capacitor for the charge pump circuit 100, which further reduces the cost for using such a charge pump circuit.

Figure 2:
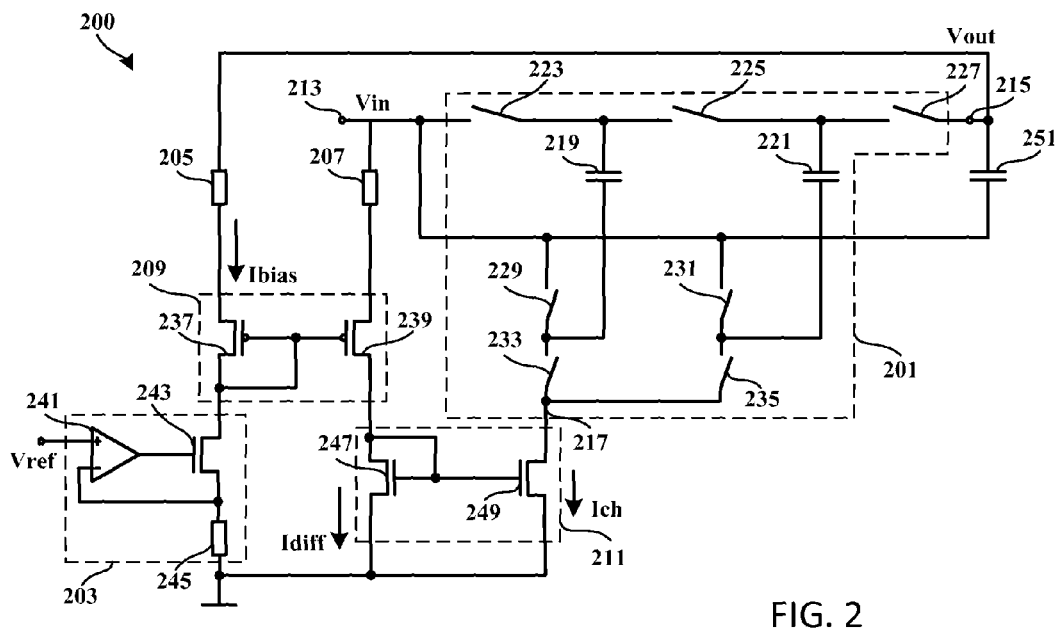
FIG. 2 shows a block diagram of a second embodiment of a circuit 200 according to the disclosure.

FIG. 2 shows a block diagram of a second embodiment of a circuit 200 according to the disclosure.

As shown in FIG. 2, the circuit 200 comprises a charge pump 201, a first level shifter 205, a second level shifter 207, a voltage follower 209 and a current multiplier 211.

The charge pump 201 has an input node 213 and an output node 215 for providing a regulated voltage therebetween. The input node 213 is configured to receive an input voltage $V_{in}$. The charge pump 201 further comprises a supply node 217 for receiving a charging current. In the embodiment, the charge pump 201 is a triple charge pump, which includes a first capacitor 219 with a first plate and a second plate, and a second capacitor 221 with a third plate and a fourth plate.

The charge pump 201 further comprises a plurality of switches for controlling charging of the first capacitor 219 and the second capacitor 221. Specifically, the first plate is coupled to the input node 213 via a first switch 223, and coupled to the third plate via a second switch 225. The second plate is coupled to the input node 213 via a fourth switch 229, and coupled to the supply node 217 via a sixth switch 233. The third plate is coupled to the output node 215 via a third switch 227. The fourth plate is coupled to the input node 213 via a fifth switch 231, and coupled to the supply node 217 via a seventh switch 235. Besides, an output capacitor 251 for the charge pump circuit 200 is coupled between the output node 215 and the input node 213.

Figure 3:
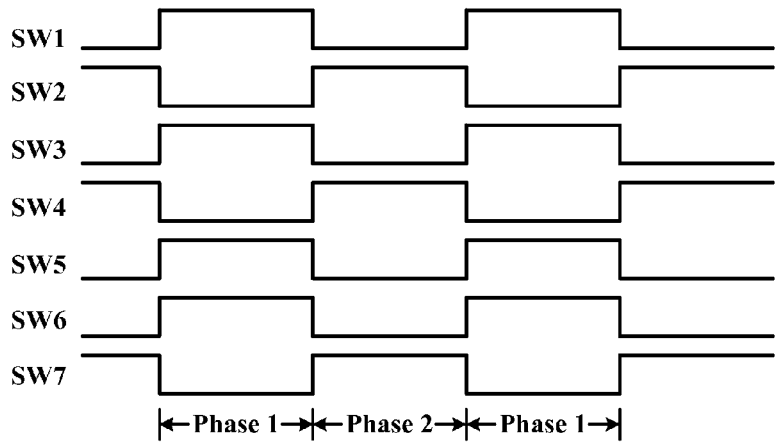
FIG. 3 shows the clock signals for controlling charging of the charge pump in the circuit 200 of FIG. 2.

FIG. 3 shows the clock signals for controlling charging of the charge pump 201 in the circuit 200 of FIG. 2. As shown in FIGS. 2 and 3, the charge pump 201 is cyclically charged. Each cycle includes two phases. In Phase 1, the switches 223, 227, 231 and 233 are turned on. Thus, the first plate is coupled to the input voltage $V_{in}$ and the first capacitor 219 is charged by the charging current $I_{ch}$, and then a first voltage difference equal to the input voltage $V_{in}$ is applied across the first capacitor 219. In Phase 2, the switches 225, 229 and 235 are turned on. Thus, the first plate is coupled to the third plate, the second plate is coupled to the input voltage $V_{in}$, and the fourth plate is coupled the supply node 217. Then the second capacitor 221 is charged by the charge pump 201. As a result, a second voltage difference equal to $2V_{in}$ is applied across the second capacitor 219. Further, in the subsequent Phase 1, the first plate is coupled to the input voltage $V_{in}$ again so as to elevate the output voltage $V_{out}$ at the output node 215 to a voltage equal to $3V_{in}$, which is the maximum amplitude of the output voltage $V_{out}$ the charge pump 201 capable to provide. It will be appreciated that, the output voltage $V_{out}$ may be a little lower than the maximum amplitude in practical applications, as the charging current $I_{ch}$ may be set below a current that is sufficient to charge the capacitors within the durations of Phase I or Phase II.

Still referring to FIG. 2, the voltage follower 209 comprises a first transistor 237 having a first gate, a first source and a first drain, and a second transistor 239 having a second gate, a second source and a second drain. The first source is coupled a second node of the first level shifter 205, and the second source is coupled to a fourth node of the second level shifter 207. Further, the first gate is coupled to the second gate and the first drain, and the second drain is configured to provide the difference current $I_{diff}$ that is generated from the second level shifter 207 to the current multiplier 211. In this way, the voltage at the second source of the second transistor 239 can be set substantially equal to the voltage at the first source of the first transistor 237. In some examples, the circuit 200 may further comprise an over voltage protector (not shown), such as a zener diode, coupled between the second gate and the second source of the second transistor 239. The overvoltage protector is configured to provide over voltage protection for the second transistor 239, so as to prevent the second transistor 239 from failure caused by a big voltage difference between the input voltage $V_{in}$ and the output voltage $V_{out}$.

The first level shifter 205 comprises a first resistor. A bias current $I_{bias}$ provided by a current source 203 is supplied to the first resistor via the first transistor 237 so as to generate a first voltage variation across the first level shifter 205. The second level shifter 207 comprises a second resistor, which applies a second voltage variation to the input voltage $V_{in}$. In this way, the voltage difference between the output voltage $V_{out}$ and the input voltage $V_{in}$ can be sensed and transferred to a difference current $I_{diff}$ flowing through the second level shifter 207 and the second transistor 239.

The current source 203 comprises a first operational amplifier 241, a third transistor 243 and a third resistor 245. The first operational amplifier 241 has a first positive input node, a first negative input node and a first output node. The first positive input node of the first operational amplifier 241 is configured to receive a reference voltage $V_{ref}$ with high accuracy, such as a band-gap voltage. The first negative input node of the first operational amplifier 241 is coupled to a source of the third transistor 243. The first output node of the first operational amplifier 241 is coupled to a gate of the third transistor 243. The third resistor 245 is coupled between the source of the third transistor 243 and a reference potential line such as ground. In this way, the reference voltage $V_{ref}$ can be applied across the third resistor 245 so as to generate the bias current $I_{bias}$ at the drain of the third transistor 243. The bias current $I_{bias}$ flows through the third transistor 243 and the third resistor 245, and is further provided to the first level shifter 205 via the first transistor 237. It will be appreciated by those skilled in this art that, the bias current $I_{bias}$ is proportional to the reference voltage $V_{ref}$ and reversely proportional to the resistance of the third resistor 245.

The current multiplier 211 is a current mirror having a pair of transistors 247 and 249. The difference current $I_{diff}$ flows through the transistor 247 and is then amplified to the charging current $I_{ch}$ flowing through the transistor 249, as their gate to source voltages are substantially equal to each other. A drain of the transistor 249 is coupled to the supply node 217 of the charge pump 201 so as to provide the charging current $I_{ch}$ thereto.

In operation, when the voltage difference between the output voltage $V_{out}$ and the input voltage $V_{in}$ fluctuates (for example, if the output voltage $V_{out}$ decreases and the input voltage $V_{in}$ remains stable), the voltage at the source of the first transistor 237 decreases and the voltage at the source of the second transistor 239 follows the change of the voltage at the source of the first transistor 237. Thus, the voltage decrease of the output voltage $V_{out}$ is applied across the second resistor of the second level shifter 207, which causes the difference current $I_{diff}$ flowing therethrough to increase. As the charging current $I_{ch}$ is proportional to the difference current $I_{diff}$, the charging current $I_{ch}$ may increase with the difference current $I_{diff}$. In this way, the charge pump will pump more charges to the output node 215 in each clock cycle so as to compensate the decrease in the output voltage $V_{out}$. Therefore, the voltage difference provided between the output node 215 and the input node 213 of the charge pump 201 can be maintained in a predetermined scope.

Figure 4:
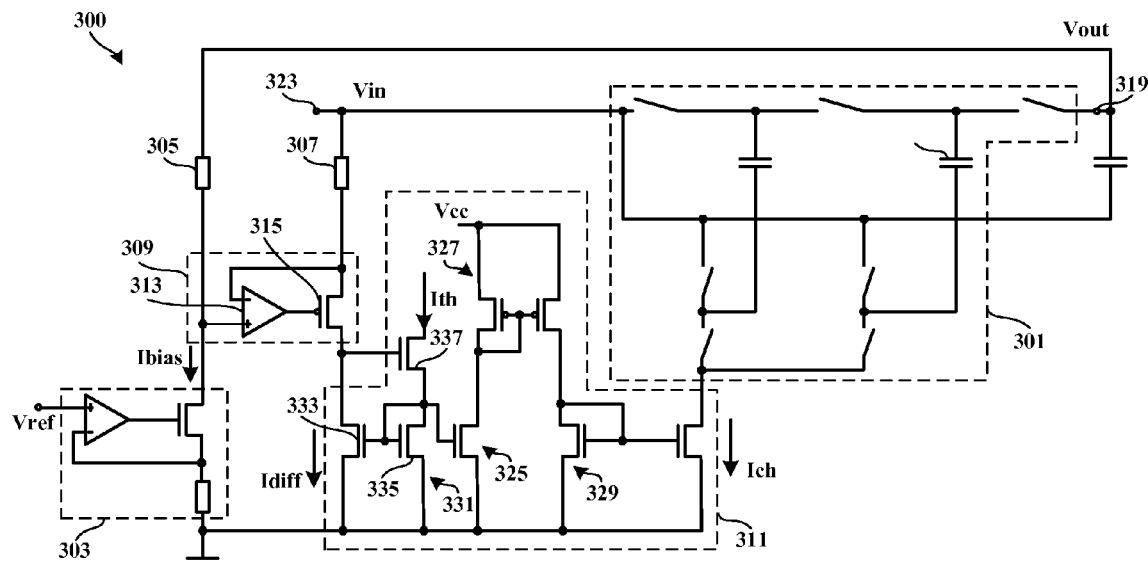
FIG. 4 shows a block diagram of a third embodiment of a circuit 300 according to the disclosure.

FIG. 4 shows a block diagram of a third embodiment of a circuit 300 according to the disclosure.

As shown in FIG. 4, the circuit 300 comprises a charge pump 301, a first level shifter 305, a second level shifter 307, a voltage follower 309 and a current multiplier 311.

In the embodiment, the voltage follower 309 comprises a second operational amplifier 313 having a second positive input node, a second negative input node and a second output node. The second operational amplifier 313 is configured to virtually connect a second node of the first level shifter 305 and a fourth node of the second level shifter 307, i.e. the voltage at the second node and the fourth node is arranged to be substantially equal to each other. In detail, the second positive input node of the second operational amplifier 313 is coupled to the second node of the first level shifter 305, and the second negative input node of the second operational amplifier 313 is coupled to the fourth node of the second level shifter 307. The second output node of the second operational amplifier 313 is coupled to a gate of a fourth transistor 315. A difference current $I_{diff}$ is provided to the current multiplier 311 through the fourth transistor 315.

The current multiplier 311 comprises a first pair 325 of NMOS transistors, a second pair 327 of PMOS transistors and a third pair 329 of NMOS transistors. The second pair 327 of PMOS transistors is coupled between the first pair 325 of NMOS transistors and the third pair 329 of NMOS transistors. Sources of the PMOS transistors of the second pair 327 are coupled to a positive power supply $V_{cc}$. The first pair 325 of NMOS transistors is configured to receive the difference current $I_{diff}$ and the third pair 329 of NMOS transistors is configured to output a charging current $I_{ch}$. The three pairs of transistors amplify the difference current $I_{diff}$ together to generate the charging current $I_{ch}$. It will be appreciated that the current multiplier 311 may comprise more pairs of transistors for amplifying the difference current $I_{diff}$.

In some examples, the circuit 300 further comprises a current limiter 331 in parallel connection with the current multiplier 311. The current limiter 331 is configured to limit the amplitude of the difference current $I_{diff}$ supplied to the current multiplier 311. In the embodiment, the current limiter 331 comprises a fifth transistor 333, a sixth transistor 335 and a seventh transistor 337. The fifth transistor 333 is shared in the first pair 325 of NMOS transistors. The fifth transistor 333 is coupled to the sixth transistor 335 in pair, wherein the fifth transistor 333 is configured to receive the difference current $I_{diff}$, and the sixth transistor 335 is configured to receive a threshold current $I_{th}$ via the seventh transistor 337. The current limiter 331 can limit the difference current $I_{diff}$ to be supplied to the current multiplier 311 below the threshold current $I_{th}$. Accordingly, the charging current $I_{ch}$ will be limited below a predetermined value as well. In this way, an output current to be provided to a load of the circuit 300 can be kept within a predetermined scope.

In operation, when the voltage difference between the output voltage $V_{out}$ and the input voltage $V_{in}$ fluctuates (for example, the output voltage $V_{out}$ decreases and the input voltage $V_{in}$ remains stable), the voltage at the positive input node of the second operational amplifier 313 decreases and the voltage at the negative input node of the second operational amplifier 313 follows the change of the voltage at the positive input node. Thus, the voltage decrease of the output voltage $V_{out}$ is applied across the second level shifter 307, which causes the difference current $I_{diff}$ flowing therethrough to increase. As the charging current $I_{ch}$ is proportional to the difference current $I_{diff}$, the charging current $I_{ch}$ increases with the difference current $I_{diff}$. In this way, the charge pump will pump more charges to the output node 319 in each clock cycle to compensate the decrease in the output voltage $V_{out}$. Therefore, the voltage difference provided between the output 319 and the input 323 of the charge pump 301 can be maintained in a predetermined scope.

From the foregoing, the regulated voltage difference can be provided between the output node 319 and the input node 323, which equals to the difference between the first voltage variation and the second voltage variation. In practical applications, the second voltage variation can be set to a much smaller value in comparison with the first voltage variation by using a large current ratio of the charging current $I_{ch}$ to the difference current $I_{diff}$. Thus, the regulated voltage difference the circuit 300 capable to provide is mainly determined by the first voltage variation, which is much easier to change by adjusting the bias current $I_{bias}$. The bias current Ibias is provided by a current source 303. Moreover, the accurate voltage sensing makes it possible to use a smaller output capacitor for the charge pump circuit 300, which further reduces the cost for using such a charge pump circuit.

It will also be readily understood by those skilled in the art that materials and methods may be varied while remaining within the scope of the present disclosure. It is also appreciated that the present disclosure provides many applicable inventive concepts other than the specific contexts used to illustrate embodiments. Accordingly, the appended claims are intended to include within their scope such processes, machines, manufacturing, compositions of matter, means, methods, or steps.

What is claimed is:

1. A circuit, comprising:
  a charge pump having an input node for receiving an input voltage, a capacitor, a transistor switching circuit having an output coupled to the capacitor, a supply node for receiving a charging current applied to an input of said switching circuit and an output node for outputting an output voltage, wherein the charge pump is configured to generate a voltage difference between the input node and the output node;
  a first level shifter having a first node coupled to the output node and a second node, the first level shifter configured to apply a first voltage variation to the output voltage in response to a bias current received from a current source;
  a second level shifter having a third node coupled to the input node and a fourth node, the second level shifter configured to apply a second voltage variation to the input voltage;

a voltage follower configured to set the voltage at the second node substantially equal to the voltage at the fourth node and to provide the difference current flowing through the second level shifter; and a current multiplier configured to generate the charging current in response to the difference current provided by the voltage follower;

wherein the current source comprises:
an operational amplifier having a positive input node, a negative input node and an output node,
a third transistor and a third resistor,
wherein the positive input node is configured to receive a reference voltage, the negative input node is coupled to a source of the third transistor, the output node is coupled to a gate of the third transistor, and the third resistor is coupled between the source of the third transistor and a reference potential line so as to provide the bias current flowing through the third transistor.

2. The circuit as claimed in claim 1, wherein the first level shifter comprises a first resistor, and the bias current is provided to the first resistor to generate the first voltage variation.

3. The circuit as claimed in claim 1, wherein the second level shifter comprises a second resistor.

4. A circuit, comprising:
a charge pump having an input node for receiving an input voltage, a capacitor, a transistor switching circuit having an output coupled to the capacitor, a supply node for receiving a charging current applied to an input of said switching circuit and an output node for outputting an output voltage, wherein the charge pump is configured to generate a voltage difference between the input node and the output node;
a first level shifter having a first node coupled to the output node and a second node, the first level shifter configured to apply a first voltage variation to the output voltage in response to a bias current received from a current source;
a second level shifter having a third node coupled to the input node and a fourth node, the second level shifter configured to apply a second voltage variation to the input voltage;
a voltage follower configured to set the voltage at the second node substantially equal to the voltage at the fourth node and to provide the difference current flowing through the second level shifter; and
a current multiplier configured to generate the charging current in response to the difference current provided by the voltage follower;
wherein the voltage follower comprises:
a first transistor having a first gate, a first source and a first drain, and
a second transistor having a second gate, a second source and a second drain,
wherein the first source is coupled to the second node of the first level shifter, the second source is coupled to the fourth node of the second level shifter, the first gate is coupled to the second gate and the first drain, and the second drain is configured to provide the difference current to the current multiplier.

5. The circuit as claimed in claim 4, wherein the voltage follower further comprises: an over voltage protector coupled between the second gate and the second source, and configured to provide over voltage protection for the second transistor.

6. The circuit as claim in claim 1, wherein the voltage follower comprises: an operational amplifier having a positive input node, a negative input node and an output node, the operational amplifier configured to virtually connect the second node and the fourth node, wherein the positive input node is coupled to the second node of the first level shifter, the negative input node is coupled to the fourth node of the second level shifter, and the output node is coupled to a gate of a fourth transistor so as to provide the difference current flowing through the fourth transistor to the current multiplier.

7. The circuit as claimed in claim 1, further comprising: a current limiter in parallel connection with the current multiplier, and configured to limit the amplitude of the difference current provided to the current multiplier.

8. The circuit as claimed in claim 1, wherein the charge pump comprises: a switched capacitor network having said transistor switching circuit formed of first and second switches coupled in series at a common node and to said capacitor, and the switched capacitor network is charged by the charging current applied to a source node of the first switch and passed to said capacitor in response to a control signal controlling alternating operation of said first and second switches.

9. A circuit, comprising:
a boost circuit having an input node, an output node, a capacitor, a transistor switching circuit having an output coupled to the capacitor and a current supply node coupled to receive a charging current for application to the transistor switching circuit;
a first level shifter coupled to the output node;
a second level shifter coupled to the input node;
a voltage follower having a first input coupled to the first level shifter, a second input coupled to the second level shifter and an output configured to generate a difference current; and
a current multiplier having an input receiving the difference current and an output configured to generate said charging current applied to the current supply node of the boost circuit;
wherein the voltage follower comprises a current mirroring circuit formed of first and second mirroring transistors having source terminals as the first and second inputs coupled, respectively, to the first and second level shifters.

10. The circuit of claim 9, wherein the voltage follower further comprises a drain terminal of the first mirroring transistor coupled to receive a reference current, and wherein the drain terminal of the second mirroring transistor generates the difference current.

11. The circuit of claim 9, wherein the current multiplier comprises a current mirroring circuit formed of a first mirroring transistor coupled to receive the difference current and a second mirroring transistor configured to generate the charging current.

12. The circuit of claim 9, wherein the voltage follower comprises a regulator circuit configured to regulate the voltage at the output of the first level shifter to substantially equal the voltage at the output of the second level shifter, and output of the regulator circuit configured to generate the difference current.

13. The circuit of claim 9, wherein the current multiplier further comprises a current limiter circuit configured to limit an amplitude of the difference current.

14. The circuit of claim 13, wherein the current limiter circuit receives a threshold current and is configured to generate from the difference current a limited difference current having an amplitude which does not exceed the threshold current.

15. The circuit of claim 14, wherein the current multiplier comprises a current mirroring circuit formed of a first mirroring transistor coupled to receive the limited difference current and a second mirroring transistor configured to generate the charging current.

16. A circuit, comprising:
  a boost circuit having an input node, an output node, a capacitor, a transistor switching circuit having an output coupled to the capacitor and a current supply node coupled to receive a charging current for application to the transistor switching circuit;
  a differencing circuit coupled to the input and output nodes and configured to sense a difference between an output voltage at the output node and an input voltage at the input node and generate a difference current which is a function of the sensed difference; and
  a current multiplier having an input receiving the difference current and an output generating said charging current applied to the current supply node of the boost circuit;
  wherein the differencing circuit comprises:
    a first circuit configured to generate a first current in response to said output voltage;
    a second circuit configured to generate a second current in response to said input voltage; and
    a current mirror circuit having a first input configured to receive the first current, a second input configured to receive the second current and an output configured to generate the difference current.

17. The circuit of claim 16, wherein the differencing circuit comprises:
  a first circuit configured to generate a first voltage in response to said output voltage;
  a second circuit configured to generate a second voltage in response to said input voltage; and
  a regulator circuit configured to generate the difference current in response to regulating the first voltage to substantially equal the second voltage.

18. The circuit of claim 16, wherein the current multiplier further comprises a current limiter circuit configured to limit an amplitude of the difference current.

19. The circuit of claim 18, wherein the current limiter circuit receives a threshold current and functions to generate from the difference current a limited difference current having an amplitude which does not exceed the threshold current, and wherein said charging current is used to generate said charging current.

* * * * *